United States Patent [19]
Scott et al.

[11] Patent Number: 6,111,977
[45] Date of Patent: *Aug. 29, 2000

[54] HAND-HELD FINGERPRINT RECOGNITION AND TRANSMISSION DEVICE

[75] Inventors: Walter Guy Scott, North Palm Beach; James E. Davis, Palm Beach Gardens, both of Fla.; Ellis Betensky, Toronto, Canada

[73] Assignee: Cross Match Technologies, Inc., West Palm Beach, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/839,934

[22] Filed: Apr. 17, 1997

[51] Int. Cl.<sup>7</sup> ...................................................... G06K 9/00
[52] U.S. Cl. ...................................... 382/124; 340/825.31
[58] Field of Search .................................. 382/124, 126, 382/127, 115; 340/825.3, 825.31, 825.34; 356/71

[56] References Cited

U.S. PATENT DOCUMENTS

| | | | |
|---|---|---|---|
| D. 348,445 | 7/1994 | Fishbine et al. ........................ | D14/107 |
| D. 351,144 | 10/1994 | Fishbine et al. ........................ | D14/107 |
| 2,500,017 | 3/1950 | Altman ........................................ | 88/57 |
| 3,200,701 | 8/1965 | White ......................................... | 88/14 |
| 3,482,498 | 12/1969 | Becker ........................................ | 95/12 |
| 3,527,535 | 9/1970 | Monroe ..................................... | 356/71 |
| 3,617,120 | 11/1971 | Roka .......................................... | 353/28 |
| 3,947,128 | 3/1976 | Weinberger et al. ..................... | 356/71 |
| 3,968,476 | 7/1976 | McMahon ........................ | 340/146.3 E |
| 4,063,226 | 12/1977 | Kozma et al. .......................... | 365/125 |
| 4,210,899 | 7/1980 | Swonger et al. ........................ | 382/127 |
| 4,414,684 | 11/1983 | Blonder ....................................... | 382/4 |
| 4,537,484 | 8/1985 | Fowler et al. ............................ | 354/62 |
| 4,544,267 | 10/1985 | Schiller ..................................... | 356/71 |
| 4,681,435 | 7/1987 | Kubota et al. ........................... | 356/71 |
| 4,792,226 | 12/1988 | Fishbine et al. ......................... | 356/71 |
| 4,811,414 | 3/1989 | Fishbine et al. ........................ | 382/124 |
| 4,876,726 | 10/1989 | Capello et al. ............................. | 382/4 |
| 4,924,085 | 5/1990 | Kato et al. ........................... | 250/227.28 |
| 4,933,976 | 6/1990 | Fishbine et al. ............................. | 382/4 |
| 4,995,086 | 2/1991 | Lilley et al. ................................. | 382/4 |
| 5,054,090 | 10/1991 | Knight et al. ............................... | 382/4 |

(List continued on next page.)

FOREIGN PATENT DOCUMENTS

| | | | |
|---|---|---|---|
| 0 101 772 A1 | 3/1984 | European Pat. Off. | .......... G07C 9/00 |
| 0 308 162 | 3/1989 | European Pat. Off. | .......... A61B 5/10 |
| 0 379 333 A1 | 7/1990 | European Pat. Off. | .......... G07F 7/10 |
| 0 379 333 B1 | 7/1995 | European Pat. Off. | .......... G07F 7/10 |
| 41 25 198 | 5/1992 | Germany | ...................... G06K 19/073 |
| 2 089 545 | 6/1982 | United Kingdom | ............. G06K 9/20 |
| WO 87/02491 | 4/1987 | WIPO | .............................. G07C 9/00 |
| WO 90/03620 | 4/1990 | WIPO | .............................. G06K 9/20 |
| WO 92/11608 | 7/1992 | WIPO | .............................. G06K 9/00 |
| WO 94/22371 | 10/1994 | WIPO | ............................. A61B 5/117 |
| WO 96/17480 | 6/1996 | WIPO | .............................. H04N 13/93 |
| WO 98/12670 | 3/1998 | WIPO | .............................. G07C 9/00 |

OTHER PUBLICATIONS

Btt (Biometric Technology Today), Finger technologies contacts, 2 pages.

Drake, M.D. et al., "Waveguide hologram fingerprint entry device," *Optical Engineering*, vol. 35, No. 9, Sep., 1986, pp. 2499–2505.

(List continued on next page.)

*Primary Examiner*—Andrew W. Johns
*Attorney, Agent, or Firm*—Sterne, Kessler, Goldstein & Fox P.L.L.C.

[57] ABSTRACT

A portable fingerprint recognition transmitter that is compact, being less than the size of a cigarette pack, allowing the fingerprint recognition transmitter to be carried by an individual in a pocket or purse. The fingerprint recognition transmitter operates to take the image of the fingerprint and formulates a fingerprint image capable of transmitting through infrared or radio frequency to a receiver having previously stored fingerprint images so as to cause a comparison between the image taken and the image stored for purposes of unlocking a security area.

41 Claims, 1 Drawing Sheet

U.S. PATENT DOCUMENTS

| | | | |
|---|---|---|---|
| 5,067,162 | 11/1991 | Driscoll, Jr. et al. | 382/5 |
| 5,067,749 | 11/1991 | Land | 283/117 |
| 5,131,038 | 7/1992 | Puhl et al. | 380/23 |
| 5,146,102 | 9/1992 | Higuchi et al. | 250/556 |
| 5,187,747 | 2/1993 | Capello et al. | 382/4 |
| 5,222,152 | 6/1993 | Fishbine et al. | 382/127 |
| 5,230,025 | 7/1993 | Fishbine et al. | 382/4 |
| 5,233,404 | 8/1993 | Lougheed et al. | 356/71 |
| 5,249,370 | 10/1993 | Stanger et al. | 34/22 |
| 5,384,621 | 1/1995 | Hatch et al. | 355/204 |
| 5,416,573 | 5/1995 | Sartor, Jr. | 356/71 |
| 5,467,403 | 11/1995 | Fishbine et al. | 382/116 |
| 5,473,144 | 12/1995 | Mathurin, Jr. | 235/380 |
| 5,517,528 | 5/1996 | Johnson | 375/259 |
| 5,528,355 | 6/1996 | Maase et al. | 356/71 |
| 5,548,394 | 8/1996 | Giles et al. | 356/71 |
| 5,591,949 | 1/1997 | Bernstein | 235/380 |
| 5,596,454 | 1/1997 | Hebert | 359/726 |
| 5,613,014 | 3/1997 | Eshera et al. | 382/124 |
| 5,615,277 | 3/1997 | Hoffman | 382/115 |
| 5,625,448 | 4/1997 | Ranalli et al. | 356/71 |
| 5,640,422 | 6/1997 | Johnson | 375/259 |
| 5,650,842 | 7/1997 | Maase et al. | 356/71 |
| 5,661,451 | 8/1997 | Pollag | 340/426 |
| 5,680,205 | 10/1997 | Borza | 356/71 |
| 5,689,529 | 11/1997 | Johnson | 375/259 |
| 5,717,777 | 2/1998 | Wong et al. | 382/124 |
| 5,748,766 | 5/1998 | Maase et al. | 382/124 |
| 5,755,748 | 5/1998 | Borza | 607/61 |
| 5,778,089 | 7/1998 | Borza | 382/124 |
| 5,781,647 | 7/1998 | Fishbine et al. | 382/1 |
| 5,812,067 | 9/1998 | Bergholz et al. | 340/825.31 |
| 5,822,445 | 10/1998 | Wong | 382/127 |
| 5,825,474 | 10/1998 | Maase | 356/71 |
| 5,848,231 | 12/1998 | Teitelbaum et al. | 395/186 |
| 5,859,420 | 1/1999 | Borza | 250/208.1 |
| 5,867,802 | 2/1999 | Borza | 701/35 |
| 5,872,834 | 2/1999 | Teitelbaum | 379/93.03 |
| 5,907,627 | 5/1999 | Borza | 382/124 |
| 5,974,162 | 10/1999 | Metz et al. | 382/124 |

OTHER PUBLICATIONS

Roethenbaugh, G. (ed.), *Biometrics Explained,* 1998, ICSA, pp. 1–34.

Ultra–Scan Corporation Home Page (visited May 20, 1999) <http://www.ultra–scan.com/index.htm>, 3 pages. (discusses technology as early as 1996).

Profile (last updated Aug. 16, 1998) <http://www.dermalog.de/Britain/Profile/profile.htm>, 3 pages. (discusses technology as early as 1990).

ID–Card System Technical Specifications (last updated Jul. 18, 1998) <http://dermalog.de/Britain/Products/ID–Card/idcard2.htm>, 2 pages.

Fujitsu Limited Products and Services (updated Apr. 21, 1999) <http://www.fujitsu.co.jp/hypertext/Products/index–e.html>, 3 pages, Copyright 1995–1999.

Verid Fingerprint Verification (visited May 17, 1999) <http://www.tssi.co.uk/products/finger.html>, 2 pages.

Startek's Fingerprint Verification Products: Fingerguard FG–40 (visited May 18, 1999) <http://www.startek.com.tw/product/fg40/fg40.html>, 3 pages.

Mytec Techologies Gateway, (visited Apr. 27, 1999) http://www.mytec.com/Products/gateway/>, 1 page.

Mytec Technologies Gateway: Features & Benefits, (visited Apr. 27, 1999) <http://www.mytec.com/Products/gateway/features.htm>, 1 page.

Mytec Technologies Touchstone Pro, (visited Apr. 27, 1999) <http://www.mytec.com/Products/Touchstone/>, 1 page.

Mytec Technologies Touchstone Pro: Features, (visited Apr. 27, 1999) <http://www.mytec.com/Products/Touchstone/features.htm>, 1 page.

Electronic Timeclock Systems and Biometric Readers (last updated Apr. 17, 1999) <http://www.lfs–hr–bene.com/tclocks.html>, 1 page.

Fingerprint Time Clock (visited May 17, 1999) <http://www.lfs–hr–bene.com/Biometrics/Fingerprintclock.html>, 6 pages.

KC–901: The KSI fingerprint sensor (visited May 17, 1999) <http://www.kinetic.bc.ca/kc–901.html>, 3 pages.

Intelnet Inc. (visited May 20, 1999) <http://www.intelgate.com/index.html>, 1 page, Copyright 1996.

Ver–i–Fus Fingerprint Access Control System (visited May 20, 1999) <http://www.intelgate.com/verifus.htm>, 2 pages. (Ver–i–fus product released in 1995).

Ver–i–fus® Configurations (visited May 20, 1999) <http://www.intelgate.com/verconfig.htm>, 1 page. (Ver–i–fus product released in 1995).

Ver–i–fus® & Ver–i–Fus$^{mil®}$ (visited May 20, 1999) <http://www.intelgate.com/vif_data.htm>, 3 pages. (Ver–i–fus product released in 1995).

Access Control System Configurations (visited May 20, 1999) <http://www.intelgate.com/access.htm>, 2 pages. (Ver–i–fus product released in 1995).

Company (visited May 17, 1999) <http://www.instainfo.com.company.htm>, 2 pages.

TouchLock™ II Fingerprint Identity Verification Terminal (visited May 17, 1999) <http://www.identix.com/TLock.htm>, 4 pages.

Physical Security and Staff Tracking Solutions (visited May 17, 1999) <http://www.identix.com/products/biosecurity.html>, 3 pages, Copyright 1996–1998.

Veriprint2000 Fingerprint Verification Terminal For Use With Jantek Time & Attendance Software (visited May 17, 1999) <http://www.hunterequipment.com/fingerprint.htm>, 2 pages.

Veriprint 2100 Stand–Alone Fingerprint Verification Terminal (visited Apr. 27, 1999) <http://www.biometricid.com/veriprint2100.htm>, 3 pages.

The Dermalog Check–ID (visited Nov. 12, 1999) <http://www.dermalog.de/ganzneu/products_check.html>, 1 page.

Startek's Fingerprint Verification Products: FingerFile 1050 (visited Oct. 8, 1999) <http://www.startek.com.tw/product/ff1050/ff1050.html>, 3 pages.

Time is Money! (visited Jun. 5, 1998) <http://www.iaus.com/afim.htm>, 3 pages.

LS 1 LiveScan Booking Workstation High Performance Finger & Palm Scanning System (visited Jun. 4, 1998) <http://www.hbs–jena.com/ls1.htm>, 6 pages, Copyright 1998.

Welcome to the Homepage of Heimann Biometric Systems GMBH (visited Jun. 4, 1998) <http://www.hbs–jena.com/>, 1 page, Copyright 1998.

Heimann Biometric Systems Corporate Overview (visited Jun. 4, 1998) <http://www.hbs–jena.com/company.htm>, 4 pages, Copyright 1998.

Remote Access Positive IDentification—raPID (visited Jun. 3, 1998) <http://www.nec.com. . .>, 2 pages, Copyright 1997.

A.F.I.S. (last updated Apr. 4, 1998) <http://www.dermalog.de/afis.htm>, 2 pages.

True–ID® The LiveScan with special "ability"..., 2 pages. (Brochure–no date).
Printrak International: User List (visited Jun. 3, 1998) <http://www.printrakinternational.com and links, 10 pages, Copyright 1996.
Live–Scan Products: TenPrinter® 1133S (visited Apr. 23, 1999) <http://www.digitalbiometrics.com/Products/tenprinter.htm>, 4 pages. (Tenprinter 1133S released in 1996).
TouchPrint™ 600 Live–Scan System (visited Apr. 23, 1999) <http://www.identix.com/products/livescan.htm>, 4 pages, Copyright 1996–1998.
Systems for Live–Scan Fingerprinting, Digital Biometrics, Inc., 8 pages, Copyright 1998.
Verid Fingerprint Reader, TSSI, 4 pages. (No date).
Copy of International Search Report for PCT/US98/07227, 3 pages.
Startek's Fingerprint Verification Products (visited Nov. 17, 1999) <http://www.startek.com.tw/product/index.html>, 1 page.
Introduction to Startek's Fingerprint Verification Products (visited Nov. 17, 1999) <http://www.startek.com.tw/product/index2.html>, 2 pages.
Automatic Fingerprint Identification System (visited Nov. 17, 1999) <http://www.sagem.com/en/produit4–en/empreinte–dig–en.htm>, 1 page.
Digital Biometrics Corporate Information (visited Nov. 17, 1999) <http://www.digitalbiometrics.com/Corporate_info/Corporate_info.htm>, 2 pages. (Discusses technology as early as 1985).
DBI Live–Scan Products: Digital Biometrics TenPrinter (visited Nov. 17, 1999) <http://www.digitalbiometrics.com/products/tenprinter.htm>, 4 pages. (Tenprinter released in 1996).
DBI Live–Scan Products: Networking Options (visited Nov. 17, 1999) <http://www.digitalbiometrics.com/products/networking_options.htm>, 3 pages.
DBI Live–Scan Products: Image Printer Stations (visited Nov. 17, 1999) <http://www.digitalbiometrics.com/products/imageprinter.htm>, 2 pages.
DBI Live–Scan Products: FC–21 Fingerprint Capture Station (visited Nov. 17, 1999) <http://www.digitalbiometrics.com/products/Fingerprintcapture.htm>, 2 pages.
Series 400 OEM Scanner (visited Nov. 17, 1999) <http://www.ultra–scan.com/400.htm>, 3 pages. (Scanner released in 1996).
USC Scanner Design (visited Nov. 17, 1999) <http://www.ultra–scan.com/scanner.htm>, 4 pages. (Scanner released in 1996).
Series 500/600 Scanners (visited Nov. 17, 1999) <http://www.ultra–scan.com/500.htm>, 3 pages. (Scanner released in 1996).
Identix: The Corporation (visited Nov. 17, 1999) <http://www.identix.com/corporate/home.htm>, 2 pages, Copyright 1996–1998.
Biometric Imaging Products (visited Nov. 17, 1999) <http://www.identix.com/products/bioimage.htm>, 1 page, Copyright 1996–1998.
TouchPrint™ 600 Live–Scan System (visited Nov. 17, 1999) <http://www.identix.com/products/livescan.htm>, 4 pages, Copyright 1996–1998.
TouchPrint™ 600 Palm Scanner (visited Nov. 17, 1999) <http://www.identix.com/products/palmscan.htm>, 3 pages, Copyright 1996–1998.
TouchPrint™ 600 Card Scan System (visited Nov. 17, 1999) <http://www.identix.com/products/cardscan.htm>, 3 pages, Copyright 1996–1998.
Dermalog Key—The safest and easiest way of access control (Last updated Jul. 18, 1998) <http://www.dermalog.de/Britain/Products/Key/key.htm>, 1 page.
Dermalog Finger–ID Your small size solution for high security (Last updated Jul. 18, 1998) <http://www.dermalog.de/Britain/Products/Finger/fingerid.htm>, 1 page.
Mytec: Corporate (visited Nov. 17, 1999) <http://www.mytec.com/corporate/>, 2 pages.
Kinetic Sciences, Inc. Fingerprinting Biometrics Division (visited Nov. 17, 1999) <http://www.kinetic.bc.ca/main-F-PB.html>, 1 page.
Pollex Technology Ltd., The Expert in Fingerprint Identification—POLLog (visited Nov. 17, 1999) <http://www.pollex.ch/english/products/pollog.htm>, 2 pages.
Sony Fingerprint Identification Terminal (visited Nov. 17, 1999) <http://www.iosoftware.com/biosols/sony/fiu/applications/fit100.htm>, 2 pages.
Sony Fingerprint Identification Unit (visited Nov. 17, 1999) <http://www.iosoftware.com/biosols/sony/fiu/index.htm>, 3 pages.
Fujitsu Fingerprint Recognition Device (FPI–550) (visited Nov. 17, 1999) <http://www.iosoftware.com/biosols/fujitsu/fpi550.htm>, 2 pages.
Mitsubishi MyPass LP–1002 (visited Nov. 17, 1999) <http://www.iosoftware.com/biosols/mitsubishi/mypass.htm>, 2 pages.
SecureTouch PV—A Personal Password Vault (visited Nov. 17, 1999) <http://www.biometricaccess.com/securetouch_pv.htm>, 1 page.
Digital Descriptor Systems, Inc.—Profile (visited Nov. .17, 1999) <http://www.ddsi–cpc.com/pages/profile.html>, 3 pages.
Press Release: Printrak International Announces New Portable Fingerprint ID Solution, Dec. 10, 1996, (visited Nov. 17, 1999) <http://www.scott.net/~dg/25.htm>, 3 pages.
Corporate Profile (visited Nov. 17, 1999) <http://www.printrakinternational.com/corporate.htm>, 1 page.
Printrak Products (visited Nov. 17, 1999) <http://www.printrakinternational.com/Products.htm>, 1 page. (Discusses technology as early as 1974).
Verifier™ 200 Fingerprint Capture Devices, Cross Match Technologies, Inc., 2 pages, 1996–1997.
Verifier 200 Direct Fingerprint Reader, Cross Check Corporation, 2 pages, 1996–1997.
Verifier ™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Cross Match Technologies, Inc.—News—Press Releases—Verifier 400 Press Release (visited Mar. 25, 1999) <http://www.crossmatch.net/new/news/news–pr–050798.html>, 1 page.
Biometric terminal, 1 page. (Advertisement, no date).

10–Print Imaging System, Cross Check Corporation, 2 pages, Copyright 1998.

Cross Match Technologies, Inc. (visited Mar. 25, 1999) <http://www.crossmatch.net/, 1 page.

Cross Match Technologies, Inc.—Products Overview (visited Mar. 25, 1999) <http://www.crossmatch.net/new/products/product–index.html>, 1 page.

Cross Match Technologies, Inc.—Law Enforcement Systems (visited Mar. 25, 1999) <http://www.crossmatch.net/new/law/law–index.html>, 2 pages.

Cross Match Technologies, Inc.—Commercial Systems: Building On The Standard (visited Mar. 25, 1999) <http://www.crossmatch.net/new/commercial/commercial–index.html>, 2 pages.

Cross Match Technologies, Inc.—International Sales (visited Mar. 25, 1999) <http://www.crossmatch.net/new/sales/sales–index.html>, 1 page.

Cross Match Technologies, Inc.—Support (visited Mar. 25, 1999) <http://www.crossmatch.net/new/support/support–index.html>, 1 page.

6,111,977

HAND-HELD FINGERPRINT RECOGNITION AND TRANSMISSION DEVICE

FIELD OF THE INVENTION

The instant invention is directed to the field of security control and, in particular, to a hand-held fingerprint recognition and transmission device.

BACKGROUND OF THE INVENTION

Access to most any secure area is commonly limited by use of a locking device. The locking device may consist of a mechanical lock or software security password. A mechanical lock has a finite amount of combinations for use in gaining access to the secured area and requires the use of a key that can be duplicated. A software style password has an infinite amount of combinations available, however, the more complicated the password, the need exists to record the password in a tangible form. Once placed in a tangible form, if a stranger has access to the password, it is simple to enter the secured area.

A password can be used as a locking mechanism wherein the password is interpreted by the computer processor which operates as a decoder to compare the password against a stored code. For instance, a computer processor can deny access to files by use of a password wherein the operator of the computer must insert the correct password in order to access the files. It is also known that such passwords can be "hacked" wherein a computer operator can use the computer processor itself in order to generate sufficient password combinations to gain access to the files. Thus, even though passwords provide infinite variables, they can be shared thereby defeating their confidentiality. In addition, the more complex the password, the greater the need to place the password in a tangible format to prevent loss.

Home security is another example of where locking mechanisms are employed to prevent an individual from entering a home or detecting when entry is made. Such locking mechanisms can be easily defeated. For instance, a key can be duplicated wherein neighbors, previous owners, and so forth may all have access to a home otherwise thought to be secured. In many instances, home owners place a key under the door-mat or alongside the entryway so that younger children will have access to the home without the necessity of carrying a key. The alarm system may supplement the locking mechanism and include an alpha-numeric keypad requiring passwords leading to the aforementioned security problem.

Yet still another example are automobile door locks remotely unlocked by use of an IR or RF transmitter. Such a device operates as a convenience to the owner, but facilitates car theft by providing a device that can be easily copied and used for opening multiple vehicles as the amount of combinations of radio frequencies and/or infrared signals is limited. Once a thief is in an automobile, the ignition lock may easily be removed.

In effect, the prior art is replete with locking mechanisms that have either a finite amount of combinations or consists of a password that can be shared by others.

Fingerprint identification systems involve the use of a computer which provide an identification probability for a match of a fingerprint to a prerecorded fingerprint held in a data base. In this manner, fingerprint recognition devices have been employed for accessing high security areas but are impractical for use with a conventional home, automobile, computer and so forth. This ineffectiveness is due to the cost of having a fingerprint recognition system installed in each area requiring security.

Thus, what is needed in the art is a portable device having the individual locking characteristic provided by a fingerprint, without the need for placing a fingerprint recognition device on each item requiring security.

SUMMARY OF THE INVENTION

The instant invention is a hand-held portable fingerprint recognition and transmission device that approximates the size of a cigarette pack allowing for complete portability. An individual may place their finger over a recognition reader wherein the reader scans the fingerprint, codes the image, and transmits the fingerprint code by infrared (IR) or radio frequency (RF) transmission to a receiver located on the item to be secured. For example, a fingerprint recognition device may be carried by an individual and if an automobile receiver has been programmed to open upon detection of an individual's fingerprint code, that individual may use a device to send a coded transmission to the automobile for use in unlocking the doors and/or ignition switch. In this manner, only individuals that have authorized access to a vehicle would have their fingerprint scanned into a memory module stored in the vehicle. The vehicle would have a receptacle located on the outside of the vehicle which awaits initiation by the aforementioned pocket-sized recognition transmitter.

In operation, an individual would place their finger over the fingerprint scanner of the instant invention, which would initiate the transmission to project the coded image to the receiver located on the vehicle. An individual may use a shared recognition transmitter for the vehicle will only open if the signal decoded matches a previously coded individual's fingerprint. In furtherance of this example, should an individual lose their transmitter, they may borrow another transmitter, for once their fingerprint is scanned by the transmitter and pointed towards a receptacle, the receptacle will release the locking mechanism only if the fingerprint transmission matches the stored image.

In yet another example, a homeowner may allow only family members access to the home. A microprocessor stores previously scanned fingerprints into a receiver which will only allow access to the home if the receiver has received a scanned fingerprint that matches one of the previously stored fingerprint images. If a child has a problem holding onto keys, a fingerprint recognition transmitter may be left outside the home for it would be of no use to anybody except for the child or another family member who has a stored fingerprint code. The child would place their finger over the scanner of the transmitter to provide the ability to unlock the home. If the transmitter has been lost or stolen, the child can borrow a transmitter as the locking mechanism is dependent upon the fingerprint, not the transmitter. An alpha-numeric keypad further provides access only to those areas desired, despite the unlocking by the fingerprint. For instance, key 1 may transmit the print and open all doors on a car, key 2 may transmit the print and open only the drivers door on a car. This keypad may also be used to disable the device to prevent theft of the individual transmitter.

The computer industry has standardized on an IR receptacle in a similar fashion as the standardized serial port. In this manner, the transmitter could be used to scan the fingerprint image and transmit the coded fingerprint image wherein the computer will have stored those fingerprint images that have access to the computer files. If an image matches, computer access is allowed. In addition, the use of a keypad may further allow security into individual areas.

The apparatus permits personalized recognition for banks and businesses, verification of identity at the point of sale transactions, authorization of financial and contractual transactions, and so forth.

Thus, an object of the instant invention is to provide a fingerprint transmitter capable of coding the image of an individual's fingerprint and transmitting it to a receiving device for comparing the transmission to a stored fingerprint for use in granting access to a secured area.

Yet another object of the instant invention is to provide a security transmitter that is universal allowing any individual to share the transmitter wherein only the fingerprint of the individual will allow the transmitter to open a secured area.

Still another object is to provide an alpha-numeric keypad in combination with a portable fingerprint recognition allowing the use of passwords in addition to the scanned image.

Other objects and advantages of this invention will become apparent from the following description taken in conjunction with the accompanying drawings wherein are set forth, by way of illustration and example, certain embodiments of this invention. The drawings constitute a part of this specification and include an exemplary embodiment of the present invention and illustrate various objects and features thereof.

DETAILED DESCRIPTION OF THE PREFERRED EMBODIMENT

Figure 1:
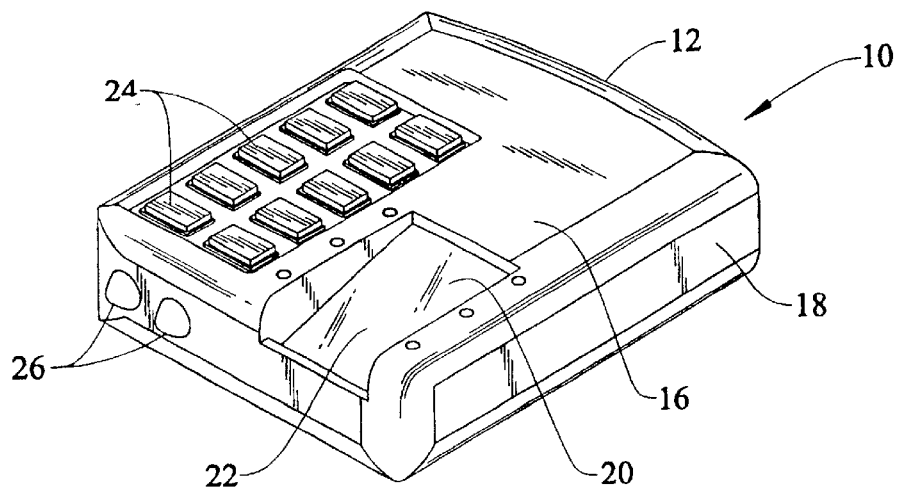
FIG. 1 is a perspective view of the fingerprint recognition transmitter.

FIG. 1 depicts the fingerprint recognition transmitter 10 of the instant invention having a housing 12 approximating the size of a cigarette pack. The housing 12 has an upper surface 16, sidewalls 18, and a lower surface, not shown. The upper surface 16 includes a fingerprint recognition area 20 having a transparent cover 22 or direct access to a prism beneath the recognition area 20. An individual can grasp the housing 12 and place a finger over the cover 22 so as to allow fingerprint image to be read through the cover 22. A proximity switch allows operation of the device once a finger is properly positioned.

The upper housing 12 includes an alpha-numeric keypad having depressible switches 24 for use in combination with the fingerprint recognition allowing for manipulation of data. For instance, the switches 24 may be used to input a password to turn on the transmitter making it worthless if stolen. The switches may be configured to send a password code to accompany a fingerprint image for purposes of accessing additional security locations. For instance, the keypad may initiate functions that are secured and transfer empowerment to a) initiate the transfer once the fingerprint has been stored and the device is pointed at a receiver; b) to instruct the receiver to perform certain functions such as i) key 1 transmits the print and opens all doors on a car; ii) key 2 may transmit the print and open only the drivers door on a car; iii) key 3 may start the engine; iv) key 6 may allow the print immediately following the owners print (valet) to lock and start the car over the following 24 hours; and v) key 9 may allow the print immediately following the owner print (valet) to become the new owner. The keypad type is only an example for the device may have keypad operation similar to a cellular phone with menus and so forth, including an alphanumeric display.

The front wall of the housing includes an IR transmitter and receiver 26. Alternatively, this may include an RF transmitter, as a replacement or addition to the IR, depending upon the type of receiver to be used with the device. The fingerprint recognition transmitter may be made as a dual function being able to send either an encoded fingerprint in either an IR or RF signal allowing manufacturers to incorporate either type of receiver in the item to be secured. Thus, automobiles that currently have the RF receiver may be modified to include a fingerprint recognition module wherein the existing system is in receptive to the transmission of a fingerprint image. Similarly, computer manufacturers who have standardized an IR input port would allow use of the device for gaining access to the computer. The transmitter 10 may also have a receiver to verify coding transfer, especially when used in an IR format. With present microprocessor power, the instant device will not recognize the prints by itself. The devices initial function is to capture and transmit prints with instructions to a receiver which will have sufficient power to recognize the prints. The receiver functions as a transmission controller as if a small packet of the transmission is lost, due to movement of the transmitter, the receiver could ask for a re-transmission of the packet. The ability to have the hand-held device recognize the prints is deemed within the scope of this invention as the current inability is due only to the noncommercial availability of an affordable microprocessor having sufficient power and sized to fit within the device housing.

Figure 2:
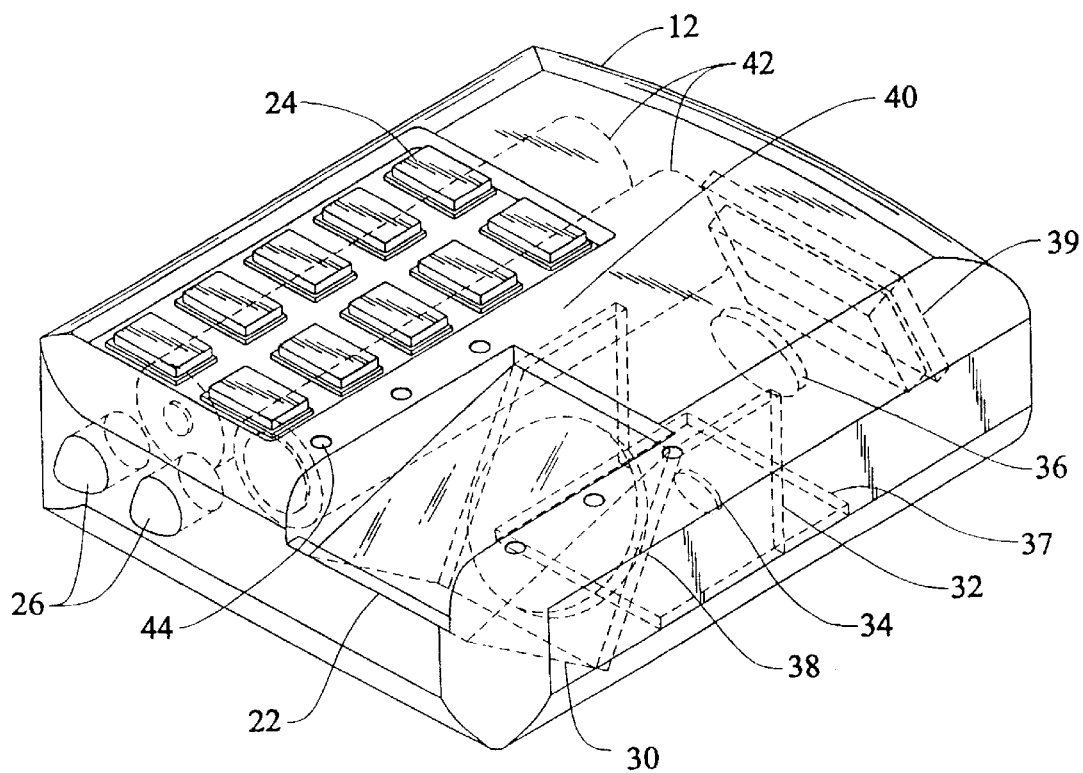
FIG. 2 is a perspective view of the fingerprint recognition transmitter illustrating individual component parts.

Referring to FIG. 2, the housing 12 shown in a partial perspective view wherein prism 30 is located beneath the recognition area wherein a proximity sensor 32 initiates operation of a CCD or CMOS camera 39 to focus the fingerprint image by use of a first plastic aspheric lens 38, which is directed through a second plastic aspheric lens 34 for reflection off a mirror folding optics 37 for direction through a third plastic aspheric lens 36. The prism 30 operates to change the focal of the fingerprint allowing for ease of interpretation through the CCD or CMOS camera as conventionally performed by fingerprint recognition devices. The IR LED transmitter and receiver 26 transfers a coded image from the microprocessor memory controller 40 coupled to the camera. The device may operate on replaceable batteries 42, or include a recharge battery.

The portable fingerprint recognition device 10 of the instant invention allows an individual to carry the recognition device on its person and allows the individual to use the fingerprint as the unique locking key for any secured area that has a receiver based upon an infrared or radio frequency receptacle. If an individual's automobile, home, and business each have fingerprint recognition receptacles, the individual may have a fingerprint scanned into each one of the receptacles thereby allowing the use of a single key in order to access each one of the aforementioned locations. In essence, the device may be used to eliminate the use of mechanical keys allowing the individual to carry a single individual fingerprint recognition transmitter.

The alpha-numerical keypad as depicted by switches 24 allows the transmitter to be further individualized so as to make the transmitter worthless to an individual who has stolen the transmitter as well as allow for additional security by allowing the use of a software password so as to allow further combinations of the lock as provided by the fingerprint when necessary. The housing 12 includes a plurality of status indicator LEDs 44, which may be used for depiction of operation of the transmitter. For instance, an LED may indicate low battery, transmitter on status, transmitter activation, fingerprint recognition and, successful fingerprint scanning and transmission, as well as verification of lock opening.

A receiver, not shown, is used for receipt of the wireless transmission and comparing the transmitted fingerprint image to a stored image. The receiver may consist of a finger print scanner for when frequent changes are required, such as in a rental vehicle or a motel room. Alternatively, a scanner by used for capturing an image for insertion into the receiver, wherein the receiver operates only as a storage device and for use in comparing the stored image to the transmitted image.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A portable fingerprint recognition and transmitter apparatus for granting access to a secured area, comprising:

a housing means;

a fingerprint reader means having a prism with a first side surface exposed through a surface of said housing means with a second side surface of said prism positioned in said housing;

a plurality of aspheric lenses optically coupled to said prism for collimating a fingerprint image;

camera means for capturing the fingerprint image focused through said plurality of aspheric lenses;

microprocessor means for encoding the fingerprint image captured by said camera means;

a transmitter means for the wireless transfer of a captured encoded fingerprint image;

a receiver means for receipt of said wireless transfer, said receiver means including a microprocessor having a memory for storing fingerprint code images wherein said receiver compares said transfer to said stored images to determine if a match occurs, wherein access to said secured area is granted if a match occurs; and disable means for disabling said portable fingerprint recognition and transmission apparatus to prevent theft of said apparatus.

2. The portable fingerprint recognition and transmitter apparatus according to claim 1 wherein said housing means includes an upper surface having a keypad operatively associated with said microprocessor means; wherein said keypad provides a manual means for inputting authorization data into said microprocessor.

3. The portable fingerprint recognition and transmitter apparatus according to claim 1 wherein said housing means includes a battery power supply.

4. The portable fingerprint recognition and transmitter apparatus according to claim 1 wherein said housing means includes a plurality of indicator lamps.

5. The portable fingerprint recognition and transmitter apparatus according to claim 1 wherein said camera means is a CCD camera.

6. The portable fingerprint recognition and transmitter apparatus according to claim 1 wherein said camera means is a CMOS camera.

7. The portable fingerprint recognition and transmitter apparatus according to claim 1 wherein said transmitter means is defined as an infrared transmitter.

8. The portable fingerprint recognition and transmitter apparatus according to claim 1 wherein said transmitter means is defined as a radio frequency transmitter.

9. The portable fingerprint recognition and transmitter apparatus of claim 1, wherein said apparatus is used to access multiple devices.

10. A portable fingerprint recognition and transmitter apparatus for granting access to a secured area, comprising:

a portable housing means;

a fingerprint reader means having a prism with a first side surface exposed through a surface of said housing means with a second side surface of said prism positioned in said housing;

at least three aspheric lenses optically coupled to said prism and placed within a mirror base for collimating a fingerprint image;

camera means for capturing the fingerprint image focused through said at least three aspheric lenses;

microprocessor means for encoding the fingerprint image captured by said camera means;

a keypad operatively associated with said microprocessor means;

a transmitter means for the wireless transfer of a captured encoded fingerprint image;

a battery power supply;

a receiver means for receipt of said wireless transfer, said receiver means including a microprocessor having a memory for storing fingerprint code images wherein said receiver compares said transfer to said stored images to determine if a match occurs, wherein access to said secured area is granted if a match occurs, and wherein said keypad provides authorized access to additional areas within said secured area; and disable means for disabling said portable fingerprint recognition and transmission apparatus to prevent theft of said apparatus.

11. The portable fingerprint recognition and transmitter apparatus according to claim 10 wherein said housing means includes a plurality of indicator lamps.

12. The portable fingerprint recognition and transmitter apparatus according to claim 10 wherein said camera means is a CCD camera.

13. The portable fingerprint recognition and transmitter apparatus according to claim 10 wherein said camera means is a CMOS camera.

14. The portable fingerprint recognition and transmitter apparatus according to claim 10 wherein said transmitter means is defined as an infrared transmitter.

15. The portable fingerprint recognition and transmitter apparatus according to claim 10 wherein said transmitter means is defined as a radio frequency transmitter.

16. A method for providing access to a secured area using a hand-held portable fingerprint recognition and transmission device, comprising the steps of:

(1) scanning an individual's fingerprint placed on the hand-held portable fingerprint recognition and transmission device;

(2) generating information representative of the individual's scanned fingerprint;

(3) transmitting the generated information to a receiver located within the secured area; and (4) granting access to the secured area when the transmitted image information matches information representative of a fingerprint previously stored in a memory of the receiver, wherein any individual is allowed to share the transmitting device and the individual's fingerprint allows the transmitting device to open the secured area.

17. The method of claim 16, wherein the secured area is a vehicle, and wherein step (4) comprises the step of granting access to the vehicle.

18. The method of claim 17, wherein step (4) comprises the step of releasing the locking mechanism of a door of the vehicle when the transmitted information matches the information representative of the fingerprint previously stored in memory.

19. The method of claim 17, wherein step (4) comprises the step of releasing the locking mechanism of a door of the vehicle when the transmitted information matches the information representative of the fingerprint previously stored in memory using a shared recognition transmitter.

20. The method of claim 16, wherein the secured area is a housing facility, and wherein step (4) comprises the step of granting access to the housing facility.

21. The method of claim 20, wherein step (4) comprises the step of unlocking the locking mechanism of a door to the housing facility when the transmitted image matches the previously coded fingerprint.

22. The method of claim 16, further comprising the step of using passwords in addition to the transmitted image matching the previously coded fingerprint before access to the secured area is provided.

23. The method of claim 22, further comprising the step of disabling the hand-held portable fingerprint recognition and transmission device to prevent theft of the transmitter.

24. The method of claim 16, wherein the secured area is a computer system, and wherein step (4) comprises the step of granting access to the computer system.

25. The method of claim 24, wherein the computer system stores one or more fingerprint images for one or more individuals having access to the computer system.

26. The method of claim 24, wherein step (4) comprises the step of granting access to the computer system when the transmitted image matches the one or more fingerprint images stored on the computer system.

27. The method of claim 26, further comprising the step of using passwords in addition to the transmitted image matching the one or more fingerprint images to gain access into individual secured areas of the computer system.

28. The method of claim 16, wherein the generated information representative of the individual's fingerprint is transmitted to the receiver via radio frequency (RF) transmission.

29. The method of claim 16, wherein the generated information representative of the individual's fingerprint is transmitted to the receiver via infrared (IR) transmission.

30. A method for permitting personalized recognition of an individual using a fingerprint recognition and transmission device, comprising the steps of:
(1) scanning the individual's finger placed on a fingerprint scanner;
(2) transmitting a coded image of a fingerprint of the individual's finger to a receiver;
(3) enabling one of personalized recognition, verification of identity, and authorization if the projected image matches a previously coded fingerprint stored in a memory module of the receiver; and
(4) disabling the fingerprint recognition and transmission device to prevent theft of the device.

31. The method of claim 30, wherein said enabling of personalized recognition comprises the step of enabling personalized recognition for access to bank accounts and business records.

32. The method of claim 30, wherein said enabling of verification of identity comprises the step of enabling verification of identity at a point of sales transaction.

33. The method of claim 30, wherein said enabling of authorization comprises the step of enabling of authorization of financial and contractual transactions.

34. The method of claim 30, wherein step (2) comprises the step of coding an image of the individual's fingerprint.

35. A method for providing authorization using a hand-held portable fingerprint recognition and transmission device, comprising the steps of:
(1) scanning an individual's finger placed on a recognition reader of said hand-held portable fingerprint recognition and transmission device, wherein said scanning of said individual's finger produces a fingerprint image;
(2) coding said fingerprint image;
(3) transmitting said coded fingerprint image and a plurality of control input functions identifying a plurality of authorizations to be performed to a receiver located on an item to be secured; and
(4) disabling the portable fingerprint recognition and transmission device to prevent theft of the a device.

36. The method of claim 35, wherein step (3) further comprises the step of generating said plurality of control input functions in response to depression of a keypad having a plurality of switches, each depressed switch identifying a different authorization for accessing said secured item.

37. The method of claim 35, further comprising the step of accessing said secured item if said coded fingerprint image matches a stored image within said receiver.

38. A method for providing authorization using a hand-held portable fingerprint recognition and transmission device, comprising the steps of:
(1) capturing an individual's fingerprint image using said hand-held portable fingerprint recognition and transmission device;
(2) determining whether the individual's fingerprint image matches a stored fingerprint image;
(3) providing access to authorization protocols on multiple devices if the individual's fingerprint image matches a stored fingerprint image; and
(4) disabling the portable fingerprint recognition and transmission device to prevent theft of the device.

39. The method of claim 38, wherein said determining step comprises the step of determining whether the individual's fingerprint image matches a stored fingerprint image in a respective receiver located on each of said multiple devices.

40. A portable fingerprint recognition and transmitter apparatus for granting access to a secured area, comprising:
a housing;
a fingerprint reader having a prism with a first side surface exposed through a surface of said housing with a second side surface of said prism positioned in said housing;
a plurality of aspheric lenses optically coupled to said prism for collimating a fingerprint image;
a camera for capturing the fingerprint image focused through said plurality of aspheric lenses;
a microprocessor for encoding the fingerprint image captured by said camera;
a transmitter for the wireless transfer of a captured encoded fingerprint image;
a receiver for receipt of said wireless transfer, said receiver including a microprocessor having a memory for storing fingerprint code images wherein said receiver compares said transfer to said stored images to determine if a match occurs, wherein access to said secured area is granted if a match occurs area; and a disabler for disabling said portable fingerprint recognition and transmission apparatus to prevent theft of said apparatus.

41. A portable fingerprint recognition and transmitter apparatus for granting access to a secured area, comprising:

a portable housing;

a fingerprint reader having a prism with a first side surface exposed through a surface of said portable housing with a second side surface of said prism positioned in said portable housing;

at least three aspheric lenses optically coupled to said prism and placed within a mirror base for collimating a fingerprint image;

a camera for capturing the fingerprint image focused through said at least three aspheric lenses;

a microprocessor for encoding the fingerprint image captured by said camera;

a keypad operatively associated with said microprocessor;

a transmitter for the wireless transfer of a captured encoded fingerprint image;

a battery power supply;

a receiver for receipt of said wireless transfer, said receiver including a microprocessor having a memory for storing fingerprint code images wherein said receiver compares said transfer to said stored images to determine if a match occurs, wherein access to said secured area is granted if a match occurs, and wherein said keypad provides authorized access to additional areas within said secured area; and a disabler for disabling said portable fingerprint recognition and transmission apparatus to prevent theft of said apparatus.

* * * * *